July 5, 1927.　　　A. D. CARDINET　　　1,634,648

INSECT TRAP

Filed March 4, 1926

ALBERT D. CARDINET
INVENTOR

PER
Albert J. Fihe
ATTORNEY.

Patented July 5, 1927.

1,634,648

UNITED STATES PATENT OFFICE.

ALBERT D. CARDINET, OF LOS ANGELES, CALIFORNIA.

INSECT TRAP.

Application filed March 4, 1926. Serial No. 92,237.

This invention relates to improvements in insect traps, especially a combined poison container and trap to be used for ants or similar insects, especially those which infest trees, and has for one of its principal objects the provision of a simple, economical, and efficient means of trapping and subsequently disposing of such insect pests.

One of the important objects of this invention is the provision, in an insect trap or the like, of a container made of paper or similar inexpensive material, which can be positioned upon a tree, wall, or any other place frequented by ants or similar pests, and which shall be provided with a cover means rendering its poison contents practically inaccessible to animals or birds, while at the same time facilitating the entry of insects.

Still another and further important object of the invention is to provide a trap for insects or the like which can be made in large quantities and very cheaply, thereby allowing of its economical use in great quantities in orchards or the like, while at the same time permitting of ready and inexpensive replacement when the occasion requires.

Other and further important objects of the invention will be apparent from the disclosures in the accompanying drawings and following specification.

The invention, in a preferred form, is illustrated in the drawings and hereinafter more fully described.

Figures 1, 2:
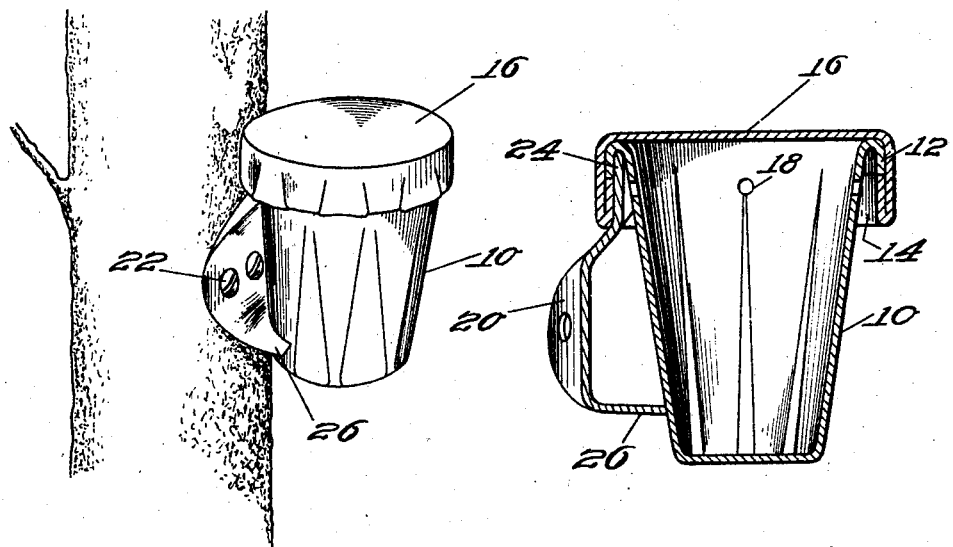
Figure 1 is a perspective view of the improved insect trap of this invention, showing the same as removably applied to a tree.
Figure 2 is a vertical sectional view illustrating the construction of the trap and its supporting means.
Figures 3, 4:
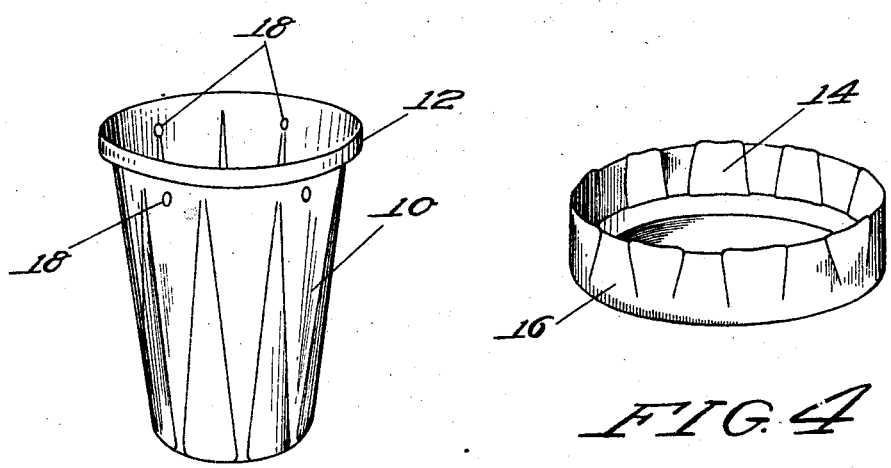
Figure 3 is a perspective view showing the lower portion of the trap and poison container.
Figure 4 is a perspective view illustrating the inside of the cover member.

The reference numeral 10 indicates generally a container, preferably in the form of a paper cup composed of paraffined paper or the like, and usually of a single sheet of paper. The cup has an overhanging upper edge 12 with which is adapted to contact a corresponding inner bent-over edge 14 of a cover member 16, which is also preferably composed of a single piece of paraffined paper formed into proper shape.

Openings 18 are provided at or near the upper edge of the receptacle 10, the openings being for the free ingress of ants or other insects which can crawl up the side of the container 10 underneath the overhanging joined edges 12 and 14, as best shown in Figure 2. The receptacle 10 is adapted to be filled with a poison syrup or the like attractive to the insects.

The entire receptacle is adapted to be supported from a tree or wall by means of a suitable bracket or hanger in the form of a plate 20, through which screws 22 pass, whereby the same is securely mounted in any desired position. The bracket is so shaped at its upper edge 24 as to fit under the overhanging edges of the cup and cover, and the lower outstanding edge 26 is formed in the shape of a semi-circle so as to accommodate the corresponding portion of the receptacle 10.

It will be seen that herein is provided an insect trap which can be readily attached in any desired position, and which, when filled with dead insects, can be conveniently removed and a new trap substituted therefor at a minimum expenditure of time, expense, and labor.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. An insect trap, including a container, an overhanging cover for said container, and means on said overhanging cover to permit ingress of insects, the container having an overhanging edge co-operating with a corresponding up-turned edge of the cover to provide a substantially irremovable closure and also providing a support for the container.

2. An insect trap, including a container, an overhanging cover for said container, means on said overhanging cover to permit ingress of insects, and means for removably supporting the trap in desired position, said means comprising a plate, means for attaching the plate to any desired object, and an upper edge integral with the plate fitting into the overlapping cover member.

3. An insect trap, including a container, an overhanging cover for said container, means on said overhanging cover to permit ingress of insects, and means for removably supporting the trap in desired position, said means comprising a plate, means for attaching the plate to any desired object, and an upper edge integral with the plate fitting into the overlapping cover member, and an integral lower extension on the plate formed to receive the corresponding lower portion of the container.

In testimony whereof I affix my signature.

ALBERT D. CARDINET.